United States Patent [19]

Powers et al.

[11] 4,441,556

[45] Apr. 10, 1984

[54] DIVERTER TOOL AND ITS USE

[75] Inventors: Charles A. Powers; George B. Holman, both of Tulsa, Okla.

[73] Assignee: Standard Oil Company, Chicago, Ill.

[21] Appl. No.: 293,808

[22] Filed: Aug. 17, 1981

[51] Int. Cl.³ .............................................. E21B 33/13
[52] U.S. Cl. .................................... 166/290; 166/292
[58] Field of Search ............... 166/289, 290, 291, 292, 166/222, 223, 285; 175/65, 72; 252/8.55 R, 8.5

[56] References Cited

U.S. PATENT DOCUMENTS

| | | | |
|---|---|---|---|
| 1,715,767 | 6/1929 | Le Flore | 166/223 |
| 3,391,737 | 7/1968 | Havens | 166/222 X |
| 4,190,110 | 2/1980 | Beirute | 252/8.55 R X |
| 4,267,062 | 5/1981 | Byerley | 252/8.55 R |

OTHER PUBLICATIONS

Crenshaw, P. L., "Setting Cement Plugs for Whipstacking and Directional Drilling," 22nd Annual Southwestern Petroleum Short Course Ass'n, et al., Meetings Proceedings, pp. 7–12, 1975.

Primary Examiner—Stephen J. Novosad
Assistant Examiner—Michael Starinshy
Attorney, Agent, or Firm—Scott H. Brown; Fred E. Hook

[57] ABSTRACT

A diverter tool and method of use thereof for use in setting a cement plug in a well. The tool comprises a hollow cylindrical body provided with a plurality cylindrical ports, the axes of which form a plane essentially perpendicular to the axis of the tool.

1 Claim, 4 Drawing Figures

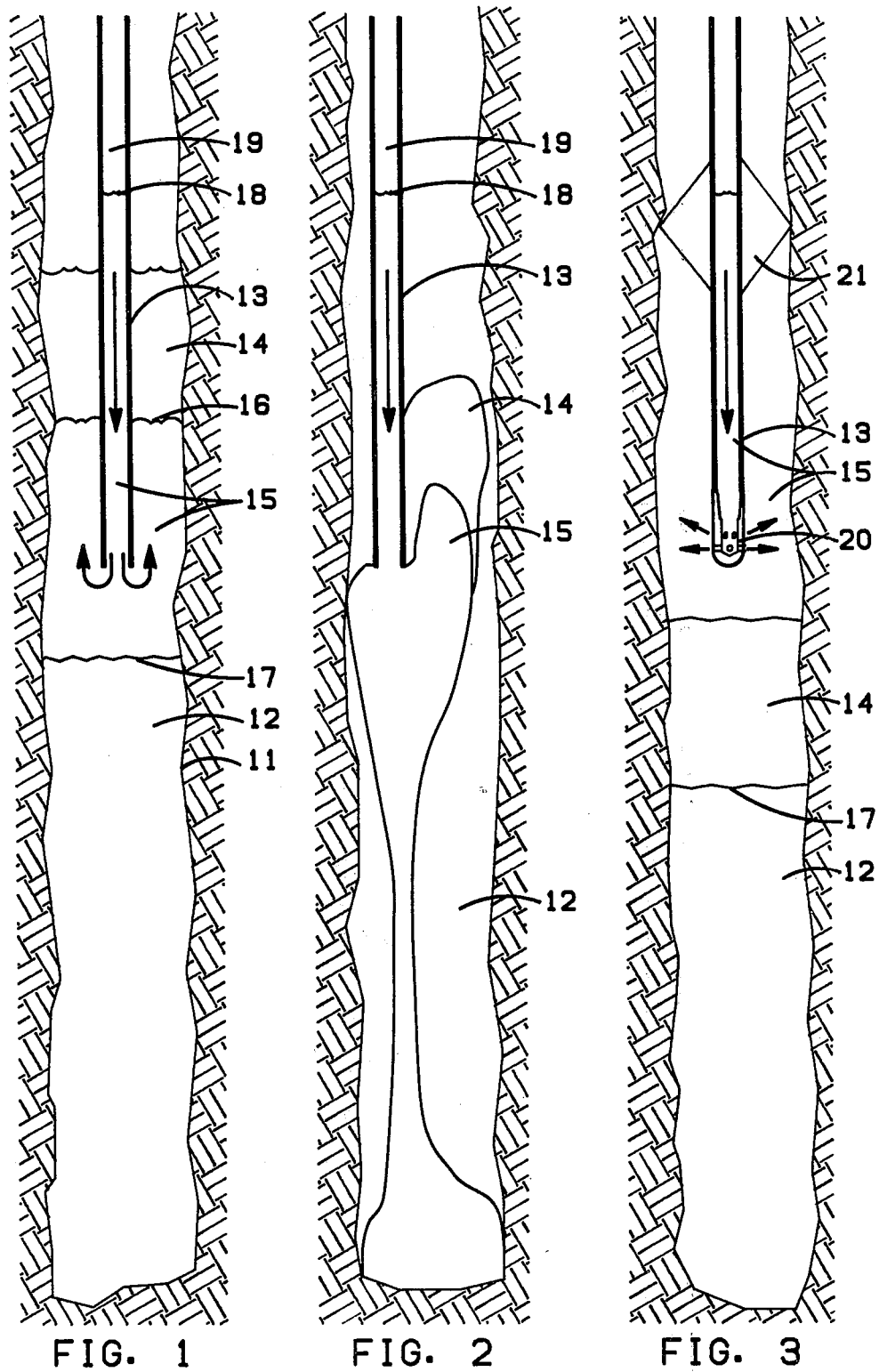

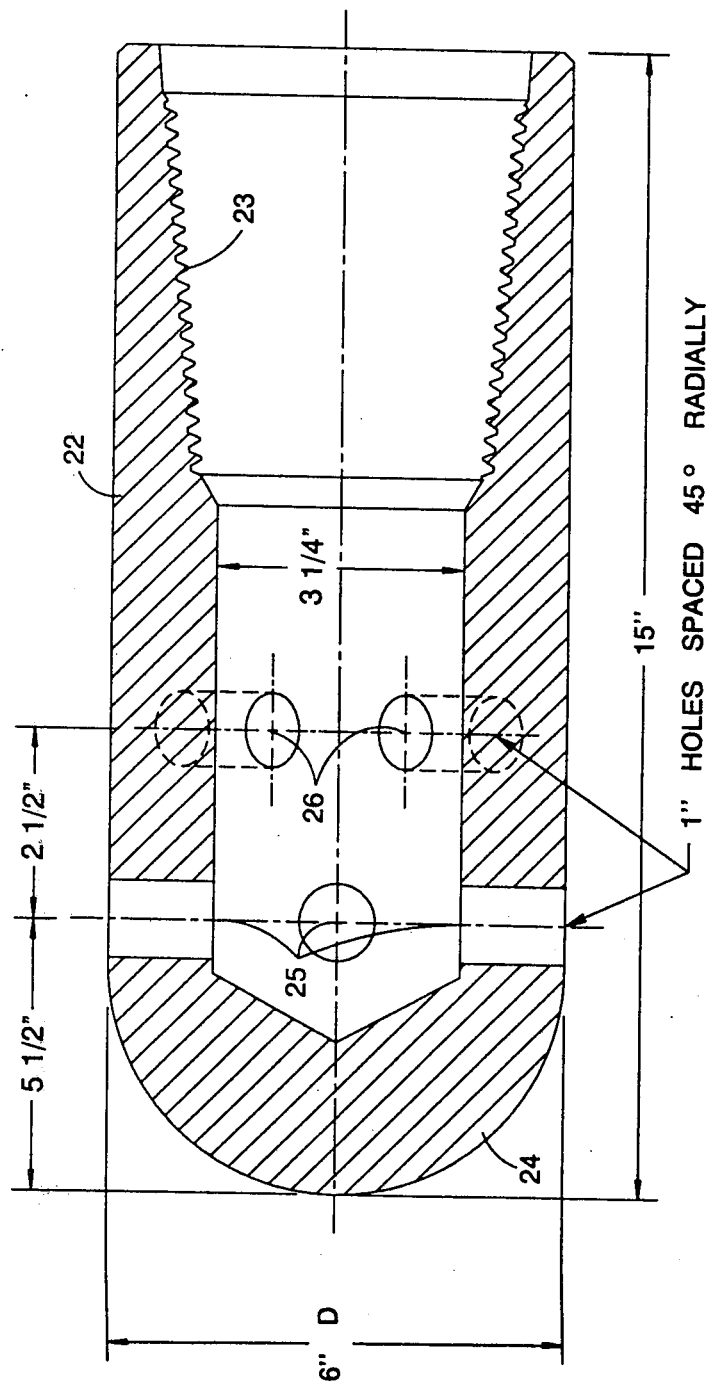

DIVERTER TOOL AND ITS USE

FIELD OF THE INVENTION

The present invention relates to an improved apparatus and method for setting cement plugs in open-holes in oil and gas wells and the like.

SETTING OF THE INVENTION

In the drilling of oil and gas wells, the lowermost part of the well must necessarily be drilled open-hole; that is, with no casing between the drill and the formations. Often there is a necessity to plug this open section. There may be several reasons for this. These include abandoning the well, plugging off lower, nonproductive portions of a well, and providing a base for kicking-off directional wells or sidetracking a well. Very often several attempts are required to set a cement plug before one is obtained which has sufficient strength for the necessary purposes and is located at the desired depth. Plug failures, of course, can result in significant loss of rig time and additional material costs. In one organization, the costs resulting from plug failures have ranged from an estimated minimum of about $3000 where inexpensive rigs were used, to several times that figure. Rig costs can be as high as $2000 per hour and the time waiting for the cement to set (usually referred to as waiting-on-cement, WOC) range from 12 to 24 hours for each attempt to set the plug. As many as five or six attempts have been required before a plug was set in a particular well. Time is also required for testing the plug, conditioning the wellbore, and mixing and spotting any subsequent plugs.

When setting cement plugs, normally the well is full of drilling fluid which may of course contain cuttings, so the first step consists in conditioning the mud, placing it in good working condition. Then a string of drill pipe frequently equipped with a centralizer near the lower, open end of the pipe is run into the well to the desired depth. Often the cement slurry is preceeded by what is called a spacer or "pill", that is, drilling mud to which has been added extra bentonite to provide extra thickening action. It has been assumed that the bentonite "pill" will provide a somewhat more stable base; i.e., will produce a temporary plug causing the following cement slurry to be reversed in direction as it leaves the open end of the drill pipe, to flow upward and produce the plug. The drill pipe is then removed and the plug permitted to set during the WOC time. The density of the cement slurry (typically around 16 to 17½ lbs/gal) is often 6 to 7 lbs/gal denser than the mud in the wellbore.

A study of the reasons for failure of the cement plug involved a search of the technical literature. This, plus the experience of the operators, indicated that the most questionable areas concerning setting of open-hole cement plugs were:

1. Stability of the cement after spotting in the wellbore. Frequently after the end of the WOC time, the cement plug has not been found or has been located hundreds of feet down the hole from where it had been originally placed.

2. Compressive strength or drillability of the cement plug required to sidetrack or directionally kick-off the well was not present.

3. The success ratio of setting open-hole cement plugs was far from desirable.

The most pertinent references found in the literature search referred to above are as follows:

1. Salahub, W. F. and Ripley, H. E., "Good Procedures Insure Open-Hole Plug Success", *World Oil*, Vol. 188, No. 1, pp. 125–128, January 1979.
2. Beirute, R. M., "Flow Behavior of an Unset Cement Plug In-Place", 53rd Annual SPE of AIME Fall Technical Conference F, October 1978, Preprint No. SPE-7589, pp. 11, 1978.
3. Martin, Madelein, Latil, M. and Vetter, P., "Mud Displacement by Slurry During Primary Cementing Jobs—Predicting Optimum Conditions", 53rd Annual Fall Conference SPE of AIME, October 1978, Preprint No. 7590, pp. 10, 1978.
4. Herdon, J. and Smith, D. K., "Setting Downhole Plugs: A State of the Art", *Petroleum Engineering*, Vol. 50, No. 4, pp. 56–71, April 1978.
5. Griffin, T. J. and Root, R. L., "Cementing Spacers and Washes Improved Production", *Oil and Gas Journal*, Vol. 75, No. 38, pp. 115–122, 125, Sept. 12, 1977.
6. Smith, D. K., "Open-Hole Cement Plugs", SPE of AIME Monogram, Vol. 4, pp. 97–103, 1976.
7. Crenshaw, P. L., "Setting Cement Plugs for Whipstocking and Directional Drilling", 22nd Annual Southwestern Petroleum Short Course Association, et al., Meeting Proceedings, pp. 7–12, 1975.
8. Goins, W. C., Jr., "Selected Items of Interest in Drilling Technology, an SPE Distinguished Lecturer", *Journal of Petroleum Technology*, July 1971, pp. 857–862.
9. Pugh, T. D., "What to Consider When Cementing Deep Wells", *World Oil*. Vol. 165, No. 4, pp. 52–57, September 1967.
10. Owsley, W. D., "Improved Casing Cementing", *Oil and Gas Journal*, pp. 76–78, Dec. 15, 1949.
11. Halliburton Services, "Open-Hole Plug Back Cementing", Halliburton Oil Well Cementing Company, Services Technical Data Sheet C-1200 (no date).

It was apparent from a review of this literature that solutions to the basic seemingly simple problem of maintaining a cement plug at a desired location while causing it to change from a slurry to a solid had been sought for many years. Numerous solutions had been proposed, yet nothing had been found which was basically satisfactory. In the paper by Beirute, for example, he noted that the stability of the interface between the cement slurry and the mud below it was crucial to successfully setting a plug. The initiation of instability of the mud-cement slurry interface could be caused by percolating gas or brine from the formation and was greatly affected by physical agitation. This physical agitation of the cement slurry penetrating the mud from open-ended tubing or drill pipe created an unstable interface and reduced the chances of the plug remaining at the desired location until it was set. A system for providing more uniform displace of the plug into the wellbore was urgently desired, and until the present, had not been obtained.

DETAILED DESCRIPTION OF THE DRAWINGS

FIG. 1 is a diagrammatic cross section of a well during the course of setting a cement plug. FIGS. 2 and 3 are also diagrammatic cross sections of such a well showing conditions of setting various kinds of plugs.

FIG. 4 shows in diagrammatic cross section of the diverter tool which is employed in this invention.

SUMMARY OF THE INVENTION

The present invention relates to the setting of cement plugs in open-holes in oil and gas wells and the like. It has been discovered that the stability and quality of cement plugs formed of conventional slurries has been greatly increased by connecting a special diverter tool at the bottom of the string of drill pipe being used to spot the mass of cement slurry at a desired zone in the open-hole section of the well. This tool changes the pattern of flow of the pumped material right at the important point where the fluid that has been pumped down the string first contacts the material already in the wellbore. The altering of fluid flow at this point from that of conventional practice results in a considerably more uniformed displacement of the cement slurry that is to form the plug which minimizes the channeling of materials through the drilling mud in the bore. It also scours the bore and creates a more stable environment for the interface between cement slurry and mud. We prefer to have multiple discharge ports in the tool which give an additional advantage of tending to center the end of the drill pipe and the tool by applying approximately radial forces of reaction due to the flow through the ports. We also prefer to improve plug stability by first spotting a bentonite-water slurry (a "pill") below the desired location of the cement plug.

DESCRIPTION OF THE PREFERRED EMBODIMENT

FIG. 1 shows in diagrammatic form a cross section of the earth into which a well 11 has been drilled. The part of the well shown is open-hole, and has been filled with drilling fluid 12 in the course of this operation. This FIGURE shows what might be considered an idealized conception of what was assumed to take place prior to our invention. Through the open lower end of the drill string 13, a spacer material (sometimes called a "pill") 14 has been pumped and presumably has risen to a position above the end of the drill string 13. At the moment shown, cement slurry 15 is flowing from the end of the drill string 13 around and back up the well to an interface 16. There is also a lower interface 17 between the cement slurry and the drill mud 12. At the top of the cement slurry, there is another corresponding interface 18 with the follower fluid 19, which probably would be a conventional drilling mud.

During experimentation in the laboratory, where it is possible to investigate what actually takes place during the flow and subsequent setting of the materials, it was found that very rarely was this idealized case found. FIG. 2 illustrates just one example of the kind of results that were obtained. In this particular case, the string of drill pipe 13 was over nearly against the side of the well and the cement slurry 15 instead of flowing up the wellbore had in fact mostly surrounded the end of the drill pipe and extended in a long stringer to a mass at the bottom of the well itself, probably due to the difference in the densities of the cement slurry and the drill mud 12. The "pill" 14 had displaced above the drill pipe in a conglomerate mass which had strung out in the wellbore.

We have discovered that it is possible to obtain good results in setting open-hole cement plugs by utilizing a diverter 20 which is used to close the bottom end of the normally open end string of drill pipe 13. Through the sidewalls of this diverter tool there are holes which are at least substantially radial in direction, as better shown in the example given in FIG. 4. Through these holes the liquids inside the drill string impinge against the fluids in the wellbore at an angle between flow lines and the upper axis not exceeding 90°, as shown by the arrows in FIG. 3. The diverter has been closed at the bottom end to prevent fluid flow in a downward direction immediately at the tool itself. This diverter can be composed of a surface-hardened metal to resist erosion, but could be made of any material that will withstand the downhole environment encountered in the wellbore.

It is seen that this diverter mechanically changes the flow patterns of the pumped fluids from vertically downward into the wellbore to a lateral or upward movement of fluid into the annulus. This altering of the flow of fluids tends to force the fluid into the face of the wellbore and in an upward direction, causing a more uniform displacement of the spacer and of the cement slurry and thus minimizing channeling. Additionally, such flow helps clean the wellbore by scouring action and creates thus a more stable environment for the interface 17 between the cement slurry and the mud 12 in the wellbore. The tool also tends to center the drill pipe in the wellbore since the streams of material issuing from the ports in the tool 20 exert a reaction force in rather radial directions from the tubing. It is, of course, possible (and desirable) additionally to equip the lower end of the drill string with a centralizer 21 or the like.

A cross section of one example of a diverter tool which has been satisfactorily employed by us in carrying out this invention is shown in FIG. 4. The tool is relatively simple in conception, consisting of a hollow cylindrically shaped body 22 of hardened steel or the like provided with the customary tool threads 23 for engaging with a string of drill pipe, and with the lowermost end 24 closed off. The holes 25 and 26 in the tool are radial ports. In the tool used experimentally, the dimensions shown in FIG. 4 are in inches so that it is apparent that the area of the opening through the center is somewhat greater than that of all of the substantially radial ports in the cylindrical wall of the tool. The port axes form a plane perpendicular to the tool axis and form approximately equal angles between adjacent axes.

When this diverter tool was used without the bentonite spacer "pill", good cement plugs were obtained with slurries weighing 13.8 lbs/gal and less, when the drill mud density was 9.0 lb/gal. Plugs attempted with slurries weighing over 13.8 lbs/gal were initially stable but shortly after slowly channelled to the bottom of the well. Based upon the results of these tests, the use of the diverter tool does increase the chances of obtaining a good cement plug at the desired location.

This is further enhanced if the bentonite spacer pill is also employed. Using the diverter and a bentonite "pill", slurries weighing as much as 15.8 lbs/gal were successfully placed and even rather fair 17½ lbs/gal densified cement plugs were placed in 9.0 lbs/gal mud.

The bentonite pill can be made up in the field by adding ordinary dry powdered bentonite to the existing drilling fluid to thicken it up and give it higher gel strength. The bentonite pill should be mixed as thick as possible but still be pumpable. The maximum amount of bentonite which can be tolerated in average low solids non-dispersed aqueous muds is around 25–30 lbs/bbl. Thus, if the mud contained 15 lbs/bbl of bentonite, an additional 10 to 15 lbs of bentonite would be mixed in to make up the pill. For example, mixing 15 lbs/bbl in ordinary drilling fluid containing already 15 lbs/bbl of bentonite produced a mud pill having a plastic viscosity of about 60 and a yield point of about 120 to about 130, which is quite satisfactory for these purposes.

Two general comments may aid the user of this invention. It has been noted that cement slurries mixed with dispersant appear to have a greater tendency to channel and become diluted with mud than those which did not have dispersant. Those slurries with dispersants had lower consistencies and viscosities which, coupled with the high density difference between the mud and the cement slurry, makes stabilization more difficult. In general, the closer the density of the cement slurry is to that of the mud the more stable the plug will tend to be. Similarly, additives which make the cement slurries more susceptible to dilution or thinner will make stabilization more difficult to obtain. If a high strength plug is required making the use of dispersant necessary, the amount of dispersant used should be minimized.

The second observation is that the reaction between mud and cement when the two are mixed together causes a tendency to gel or thicken shortly after the contact. In some cases this gelling can contribute to cement plug stability particularly if it extends across the wellbore. This may explain why some high density plugs are successfully set in low density drilling muds at the initial attempt.

Recent successful use of the diverter tool and the technique discussed above can be cited. For example, in late 1980 a diverter tool was utilized in the Granite Point Well No. 8, Platform Bruce in Cook Inlet, Alaska, to set a cement plug with the bottom at 10,518 ft and the top at 10,117 ft, the average inclination of the wellbore being 33° from vertical. The hole diameter was 8.5 inches. The drill pipe that was used included 10 stands of heavy wall 5 inch OD pipe, the remainder being 4.5 inch OD; the mud density was 10.9 lbs/gal with a plastic viscosity of 28, a yield point of 26, and a 10 minute gel strength of 3/12. The cement used was Class G at a slurry density of 17.5 lbs/gal using 3.44 gal of water per sack to yield 0.938 cubic feet per sack, mixing on the fly to produce a thickening time of 4 hours, 40 minutes with a plastic viscosity of 124 and a yield point of 47. The bentonite pill was not used. After a WOC time of approximately 16 hours, the cement plug was used for sidetracking in the well, being kicked-off from the plug with a Dynadril. The plug proved to be very effective.

Also in late 1980, in the Bitter Creek Field, Wyoming, Bitter Creek II No. 5 was plugged using the diverter tool and the bentonite pill. The setting depth of the cement plug was between 15,974 ft and 14,860 ft with an average inclination of wellbore of about $1\frac{3}{4}°$ from the vertical. The hole diameter was estimated at approximately 11 inches. The drill pipe diameter employed for the plugging was 5 inch OD. The type of mud used in the wellbore had a density of 13.6 lbs/gal with a plastic viscosity of 22, a yield point of 19, and a 10 minute gel strength of 3/20. Class G cement was used in the slurry to form a density of 16.7 lbs/gal using 5.1 gals of water per sack with a yield of 1.36 cubic feet per sack. Thirty-five percent silica flour with 0.75% CFR2 and 1.2% HR12 were used as additives in the cement. The slurry was batch mixed to a thickening time of 3 hours and 50 minutes. The pill consisted of 24 bbls of approximately 25 lbs/bbl of bentonite. Forty-two pounds of SAM No. 4 spacer were used weighed up to 14.7 lbs/gal. The plug proved to set right where it had been established.

While this invention has been described in terms of certain embodiments, it is to be understood by those reading this patent that it is only limited by the scope of the appended claims.

We claim:

1. An improved method for setting a cement plug in an open-hole section of a wellbore above the bottom thereof, said wellbore being filled above said section with liquid, including drilling mud, comprising:

lowering into said wellbore a string of pipe to the lower end of which is attached a diverter tool closing the lower end of said pipe, said diverter tool being provided with a closed lower end and a plurality of radially directed ports, whereby said ports are located essentially at the base of said section;

pumping through said pipe and through said ports into said wellbore, in order, a spacer liquid, a preselected volume of cement slurry to form a cement plug, and a follower liquid, until said slurry is in said wellbore, and withdrawing said pipe string to permit undisturbed setting of said cement slurry to form said cement plug, wherein the last of said spacer liquid before said cement slurry is made of a pumpable mixture of thickened drilling mud containing approximately 25–30 lbs/bbl of bentonite, whereby the plastic viscosity thereof is of the order of 60 and the yield point thereof is of the order of 120 to 130.

* * * * *